(12) United States Patent
Blackburn et al.

(10) Patent No.: US 7,860,786 B2
(45) Date of Patent: Dec. 28, 2010

(54) PREDICTIVE SCORE FOR LENDING

(75) Inventors: Jeremy J. Blackburn, Inver Grove Heights, MN (US); Vikram A. Kashyap, San Francisco, CA (US); Anthony T. Banas, Chicago, IL (US)

(73) Assignee: Canopy Acquisition, LLC, Omaha, NE (US)

( * ) Notice: Subject to any disclaimer, the term of this patent is extended or adjusted under 35 U.S.C. 154(b) by 520 days.

(21) Appl. No.: 11/827,111

(22) Filed: Jul. 10, 2007

(65) Prior Publication Data
US 2008/0091592 A1 Apr. 17, 2008

Related U.S. Application Data

(60) Provisional application No. 60/829,879, filed on Oct. 17, 2006.

(51) Int. Cl.
*G06Q 40/00* (2006.01)
(52) U.S. Cl. .............................. 705/38; 705/4
(58) Field of Classification Search .................. 705/38, 705/4
See application file for complete search history.

(56) References Cited

U.S. PATENT DOCUMENTS

| | | | | |
|---|---|---|---|---|
| 2003/0023544 A1* | 1/2003 | Chodes | ........................ | 705/38 |
| 2003/0208422 A1* | 11/2003 | Burczyk | ....................... | 705/35 |
| 2005/0027983 A1* | 2/2005 | Klawon | ....................... | 713/168 |
| 2005/0216315 A1* | 9/2005 | Andersson | ...................... | 705/4 |

* cited by examiner

*Primary Examiner*—James Kramer
*Assistant Examiner*—Lindsay M. Maguire
(74) *Attorney, Agent, or Firm*—Kilpatrick Stockton LLP; Eugene B. Joswick, III

(57) ABSTRACT

Methods and apparatus, including computer program products, for a predictive score for lending. A method includes receiving an employee's health insurance plan design information and general health and wellness data, weighting selected ones of the employee's health insurance plan design information and general health and wellness data, and generating a credit risk indicator from the weighted selected ones of the employee's health insurance plan design information and general health and wellness data.

12 Claims, 5 Drawing Sheets

Health insurance plan design indicators database 50

Health plan type indicator 54

Health plan start date indicator 56

Deductible amount indicator 58

Deductible amount as a percentage of income indicator 60

Annual premium amount indicator 62

Annual premium amount as percentage of income indicator 64

Annual out of pocket maximum amount indicator 66

Annual out of pocket maximum as percentage of income indicator 68

Annual contribution maximum amount indicator 70

Annual contribution maximum as a percentage of income indicator 72

Employee contributions to annual premium indicator 74

Employee contributions to annual premium as percentage of income indicator 76

Insurance plan riders indicators 78

Insurance plan rider type indicator 80

Rider coverage as percentage of annual out of pock maximum indicator 82

Employer contributions to a healthcare payment account indicator 84

Employer contribution amounts to a healthcare payment account indicator 86

Number of contiguous years of insurance coverage indicator 88

Employee/insured payroll contributions to a healthcare payment account indicator 90

FIG. 2

General information database 100

Applicant gender 102

Applicant ethnicity 104

Smoke cigarettes, pipes or cigars 106

Use of other chewing tobacco 108

Self-reported description of general health 110

Exercise habits 112

Fruit consumption 114

Red meat, cheese, and fried food consumption 116

Likelihood of lifestyle change in near future 118

Likelihood of overeating 120

Sleep patterns 122

Alcohol consumption 124

Body mass index 126

Total cholesterol 128

High-density lipoprotein (HDL) cholesterol level 130

Blood pressure (systolic) 132

Blood pressure (diastolic) 134

Over the counter medicine consumption 136

Prescription medicine consumption 138

Sunscreen usage 140

Examined or treated for cancer/tumor disorders 142

Examined or treated for health/circulatory disorders 144

Examined or treated for reproductive disorders 146

Examined or treated for intesinal/endocrine disorders 148

Examined or treated for brain/nervous disorders 150

Examined or treated for immune disorders 152

Examined or treated for lung/respiratory disorders 154

Examined or treated for eyes/ears/nose/throat disorders 156

Examined or treated for urinary/kidney disorders 158

Examined or treated for bones/muscle disorders 160

Examined or treated for mental health/substance abuse disorder 162

Examined or treated for transplants 164

Other medical matters 166

FIG. 3

Personally-identifiable information database 200

Employee social security number 202

Insured date of birth 204

Employment type 206

Employee age 208

Number of dependants 210

Length of employment with current employer 212

Gross monthly insured income 214

Insured pay interval 216

Home owner or renter 218

Length of time at current residence 220

Total monthly mortgage or rent payment 222

Total bank balances (all accounts) 224

FIG. 4

Consumer credit score information database 400

Employee/insured consumer credit score 402

Spouse consumer credit score 404

Applicable dependant consumer credit score 406

Receiving
indicators
1002

↓

Weighting
the indicators
1004

↓

Adding a sum
of the weighted scores
to the credit score
1006

↓

Divide interim value
by constant to generate
a credit risk indicator
1008

FIG. 6

PREDICTIVE SCORE FOR LENDING

CROSS REFERENCE TO RELATED APPLICATION

This application claims benefit of U.S. Provisional Application Ser. No. 60/829,879, filed Oct. 17, 2006, the entire contents of which are incorporated herein by reference.

BACKGROUND

The present invention relates to data processing by digital computer, and more particularly to a predictive score for lending.

As the cost of health care continues to increase, health care consumers look increasingly to health care lenders to borrow funds needed to compensate health care providers for health care services. These health care lenders can include, for example, the health care providers themselves or third party lenders, such as insurance companies, savings institutions, credit unions, banks and so forth. In tight economic times, all too many borrowers can default on their loan obligations, leaving the lenders "holding the bag." Accordingly, lenders wish to make money commitments to health care consumers with some advanced or prior assurance that money that is lent will reasonably be expected to be repaid.

SUMMARY

The present invention provides methods and apparatus, including computer program products, for a predictive score for lending.

In general, in one aspect, the invention features a method including generating a credit risk indicator from an employee's health insurance plan design information and general health and wellness data.

In embodiments, the individual's health insurance plan design information and general health and wellness data can include a credit score, an employment premium as a percentage of income score, a deductible as a percentage of income score, a length of employment in years, an employee's age in years, and an annual out of pocket maximum as a percentage of income score.

The individual's health insurance plan design information and general health and wellness data can include a score with a numerical range of 300 to 850.

Generating can include weighting the individual's health insurance plan design information and general health and wellness data.

Weighting the individual's health insurance plan design information and general health and wellness data can include multiplying the employment premium as a percentage of income score by 15 and subtracting 850 to generate a weighted employment premium as a percentage of income score, multiplying the deductible as a percentage of income score by 15 and subtracting 850 to generate a weighted deductible as a percentage of income score, multiplying the length of employment in years by 17 to generate a weighted length of employment, multiplying the employee's age in years by 13 to generate a weighted employee's age, and multiplying the annual out of pocket maximum as a percentage of income score by 15 and subtracting 850 to generate a weighted annual out of pocket maximum as a percentage of income score.

The credit risk indicator can include adding weighted scores to the credit score and dividing by 6.

In another aspect, the invention features a method including modifying an employee's credit score, employment premium as a percentage of income score, deductible as a percentage of income score, length of employment in years, age in years and annual out of pocket maximum as a percentage of income score to generate a weighted employment premium as a percentage of income score, a weighted deductible as a percentage of income score, a weighted length of employment in years, a weighted age in years and a weighted annual out of pocket maximum as a percentage of income score, and adding the weighted scores to the credit score and dividing by a constant to generate a credit risk indicator.

In embodiments, modifying can include multiplying the employment premium as a percentage of income score by 15 and subtracting 850 to generate the weighted employment premium as a percentage of income score, multiplying the deductible as a percentage of income score by 15 and subtracting 850 to generate the weighted deductible as a percentage of income score, multiplying the length of employment in years by 17 to generate the weighted length of employment, multiplying the employee's age in years by 13 to generate the weighted employee's age, and multiplying the annual out of pocket maximum as a percentage of income score by 15 and subtracting 850 to generate the weighted annual out of pocket maximum as a percentage of income score. The constant can be 6.

In another aspect, the invention features a method including receiving an employee's health insurance plan design information and general health and wellness data, weighting selected ones of the employee's health insurance plan design information and general health and wellness data, and generating a credit risk indicator from the weighted selected ones of the employee's health insurance plan design information and general health and wellness data.

In embodiments, the employee's health insurance plan design information and general health and wellness data can be selected from the group consisting of health insurance plan profile information, general health information of the employee, personally-identifiable information and demographic information, and consumer credit score information.

The credit risk indicator can represent risks a creditor faces when lending to the employee that owns an account from which he/she uses to save or invest money designated for health-related expenses, receives contributions from others including his employer, pays for insurance premiums, or pays healthcare providers or merchants of health-related products and services.

The invention can be implemented to realize one or more of the following advantages.

A computer-implemented method generates a score predictive of a likely repayment amount from an individual debtor in a heath care lending context.

A method generates a predictive score that is a unique quantitative assessment of a debtor's fitness to receive credit from a creditor.

A generated predictive score determines likely repayment terms including interest rates, term length, fee amounts and payment frequency to a selected creditor from an individual.

A generated predictive score assesses the risk or risks a creditor faces when lending to a debtor that owns an account from which he uses to save or invest money designated for health-related expenses, receives contributions from others including his employer, pays for insurance premiums, or pays health care providers or merchants of health-related products and services.

A generated predictive score is designed for individuals that are in high deductible health plans that place greater financial risk on the individual as the deductible may be higher than the individual's ability to pay for expenses up to it. In addition, some of these accounts are tax-advantaged and the consumer may wish to maximize savings in the account while tapping into a line of credit.

One implementation of the invention provides all of the above advantages.

Other features and advantages of the invention are apparent from the following description, and from the claims.

BRIEF DESCRIPTION OF THE DRAWINGS

FIG. 2 is a block diagram of an exemplary health insurance plan design indicators database.

FIG. 3 is a block diagram of an exemplary general information database.

FIG. 4 is a block diagram of an exemplary personally-identifiable information database.

FIG. 5 is a block diagram of an exemplary consumer credit score information database.

FIG. 6 is a flow diagram of a predictive scoring process.

Like reference numbers and designations in the various drawings indicate like elements.

DETAILED DESCRIPTION

Figure 1:
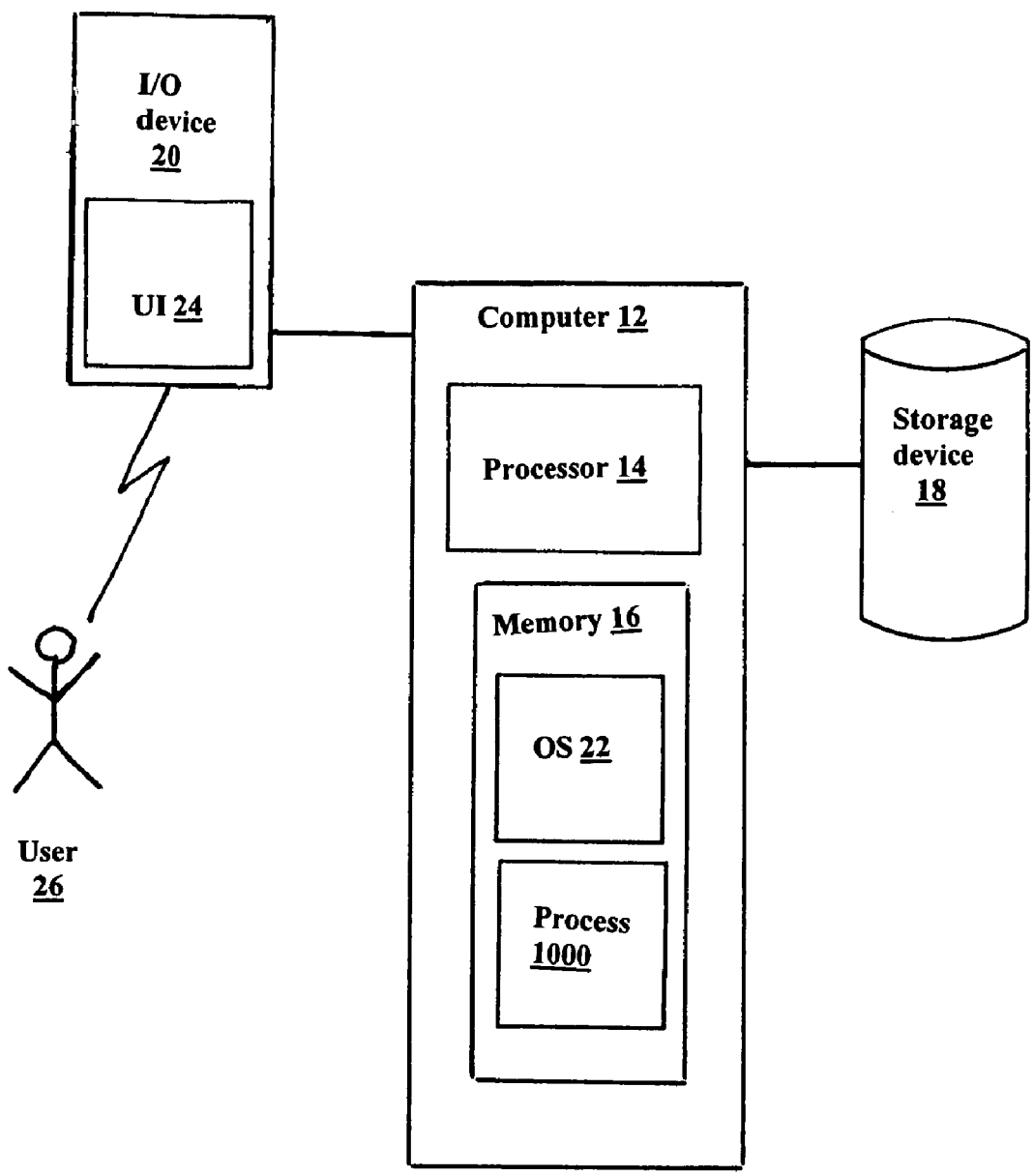
FIG. 1 is a block diagram of an exemplary system.

As shown in FIG. 1, an exemplary system 10 includes a computer 12. Computer 12 includes a processor 14, memory 16, storage device 18 and input/output (I/O) device 20. Memory 16 includes an operating system (OS) 22, such as Linux, UNIX, Apple OS or Microsoft windows, and a predictive scoring process 1000, described in detail below.

The I/O device 20 can include a user interface (UI) 24 for display to a user 26.

In one particular example, process 1000 generates a three digit predictive score that is a unique quantitative assessment of a debtor's fitness to receive credit from a creditor and determines the likely repayment terms including interest rates, term length, fee amounts, and payment frequency to the selected creditor by the individual. In another example, the generated predictive score becomes an input to an existing credit policy of a financial institution.

Memory 16 and/or the storage device 18 store raw data that is used by process 1000 to generate the predictive score. When stored in storage device 18, the data can be stored in one or more flat files or in one or more database management system (DBMS) files.

As shown in FIG. 2, an exemplary health insurance plan design indicators database 50 includes a number of indictors. These indicators can include: a health plan type indicator 54, a health plan start date indicator 56, a deductible amount indicator 58 and a deductible amount as a percentage of income indicator 60.

These indicators can include an annual premium amount indicator 62, an annual premium amount as percentage of income indicator 64, an annual out of pocket maximum amount indicator 66 and an annual out of pocket maximum as percentage of income indicator 68.

These indicators can include an annual contribution maximum amount indicator 70, an annual contribution maximum as a percentage of income indicator 72, an employee contributions to annual premium indicator 74 and an employee contributions to annual premium as percentage of income indicator 76.

These indicators can include insurance plan riders indicators 78, an insurance plan rider type indicator 80 and rider coverage as percentage of annual out of pock maximum indicator 82.

These indicators can also include an employer contribution to a healthcare payment account indicator 84, an employer contribution amounts to a healthcare payment account indicator 86, a number of contiguous years of insurance coverage indicator 88 and an employee/insured payroll contributions to a healthcare payment account indicator 90.

As shown in FIG. 3, an exemplary general information database 100 includes a number of indicators. These indicators can include applicant gender 102, applicant ethnicity 104, smoke cigarettes, pipes or cigars 106 and use of other chewing tobacco 108.

These indicators can include self-reported description of general health 110, exercise habits 112, fruit consumption 114, red meat, cheese, and fried food consumption 116, likelihood of lifestyle change in near future 118 and likelihood of overeating 120.

These indicators can include sleep patterns 122, alcohol consumption 124, body mass index 126, total cholesterol 128, High-density lipoprotein (HDL) cholesterol level 130, blood pressure (systolic) 132, blood pressure (diastolic) 134, over the counter medicine consumption 136, prescription medicine consumption 138 and sunscreen usage 140.

These indicators can include examined or treated for cancer/tumor disorders (e.g., breast, colon, leukemia, lymphoma, liver, lung, melanoma, other) 142, examined or treated for health/circulatory disorders (e.g., aneurysm, bypass, angioplasty, congestive heart failure, elevated cholesterol, heart disease, high blood pressure, phlebitis, skin ulcer, stroke, varicose veins, other) 144.

These indicators can include examined or treated for reproductive disorders (currently pregnant, multiples expected, pregnancy complications, breast disorders, endometriosis, infertility, other) 146 and examined or treated for intestinal/endocrine disorders (e.g., chronic pancreatitis, colon disorder, Crohn's, ulcerative colitism, diabetes, gallbladder, hepatitis b/c, hiatal hernia/reflux, liver disorder, ulcer, growth hormones, other) 148.

These indicators can include examined or treated for brain/nervous disorders (e.g., Alzheimer's disease, cerebral palsy, migraines, multiple sclerosis, paralysis, seizures/epilepsy, Parkinson's disease, other) 150 and examined or treated for immune disorders (e.g., AIDS, HIV+, Lupus, other) 152.

These indicators can include examined or treated for lung/respiratory disorders (e.g., allergies, Asthma, cystic fibrosis, emphysema, chronic bronchitis, pneumonia, tuberculosis, sleep apnea, other) 154, examined or treated for eyes/ears/nose/throat disorders (e.g., acoustic neuroma, cataracts, chronic ear infections, chronic sinusitis, cleft lip/palate, deviated septum, glaucoma, retinopathy, other) 156, examined or treated for urinary/kidney disorders (e.g., kidney stones, neurogenic bladder, polycystic kidney disease, prostate disorder, renal failure, other) 158 and examined or treated for bones/muscle disorders (e.g., Arthritis (rheumatoid or osteo), bulging/herniated disc, joint injury, pituitary dwarfism, pulled/strained muscle, spina bifida, other back or neck disorders, other) 160.

These indicators can include examined or treated for mental health/substance abuse disorder (e.g., alcoholism, anxiety/depression, attention deficit disorder, bipolar/manic depression, drug abuse, eating disorder, suicide attempt, other) 162, examined or treated for transplants (e.g., bone marrow, discussed possible future transplants, organ, other) 164 and other medical matters (e.g., abnormal test or physical results, condition or congenital disorder not mentioned above, treatment or surgery discussed or advised, but not yet done, unexplained weight change, other) 166.

As shown in FIG. 4, an exemplary personally-identifiable information database 200 includes a number of indicators. These indicators can include employee social security number 202, insured date of birth 204, employment type (e.g., full time, part time, unemployed) 206, employee age 208, number of dependants 210, length of employment with current employer 212 and gross monthly insured income 214, insured pay interval (i.e., weekly, bi-weekly, monthly, other) and gross monthly household income 216.

These indicators can include home owner or renter 218, length of time at current residence 220, total monthly mortgage or rent payment 222 and total bank balances (all accounts) 224.

As shown in FIG. 5, an exemplary consumer credit score information database 400 includes a number of indicators. These indicators include employee/insured consumer credit score 402, spouse consumer credit score 404 and applicable dependant consumer credit score 406.

As described above, in a particular example, process 1000 uses the raw data contained in databases 50, 100, 200, 400 to generate a credit score for predicting and managing the unique risks associated with lending to consumers with high-deductible health plans. More specifically, process 1000 generates a score predictive of a likely repayment amount from an individual debtor in a healthcare lending context using a series of computer-implemented calculations that combine a database or databases of variables relating to the health insurance plan design of the individual (both historical and current), the general health of a consumer based on indicators and variables gathered and used by insurance carriers in determining plan eligibility and premium price, and a commercially available consumer credit score (such as the Fair Isaac Risk Score or that of a credit bureau such as Experian, Equifax, TransUnion, and so forth). The resulting three digit predictive score is a unique quantitative assessment of a debtor's fitness to receive credit from a creditor and determines the likely repayment terms including interest rates, term length, fee amounts, and payment frequency to the selected creditor by the individual.

In one particular example, only data elements from databases 50, 200, 400 are used by process 1000 to generate a statistically-relevant score for an individual. In other examples, data elements from database 100 can be included in process 1000 and may make a generated score more predictive of risk, but it is not required.

For example, process 1000 uses the employee/insured consumer credit score 402, employee contributions to annual premium as percentage of income indicator 76, deductible amount as a percentage of income indicator 60, length of employment with current employer 212, employee age 208 and annual out of pocket maximum as percentage of income indicator 68 to generate a score. In this specific example, process 1000 uses the following approach with these indicators:

|  | Min | Max | Low Range | High Range |
| --- | --- | --- | --- | --- |
| FICO Score | 300 | 850 | 300 | 850 |
| Employee Premium as % of Income | 300 | 850 | 1% | 50% |
| Deductible as a % of Income | 300 | 850 | 1% | 50% |
| Length of Employment | 300 | 850 | 1 | 360 |

-continued

|  | Min | Max | Low Range | High Range |
| --- | --- | --- | --- | --- |
| Age | 300 | 850 | 18 | 65 |
| Annual OOP Max as % of Income | 300 | 850 | 1% | 50% |
|  | 1800 | 5100 |  |  |
|  | 300 | 850 |  |  |

In this approach, the employee's insurance premium as a percentage of income can range between 1% and 50%. These actual percentages equate to a score in the range of 300 to 850 (e.g., a 1% premium to income ratio equates to 850, a 50% premium to income ratio equates to 300, and a 25% premium to income ratio is 575). All of the data points follow this same format, generating a baseline 300 to 850 score for each of the line items above.

In this particular example, each of the line items is then weighted by process 1000 using the following assumptions:

| FICO Score | Actual Score |
| --- | --- |
| Employee Premium as % of Income | Percentage * 15-850 |
| Deductible as a % of Income | Percentage * 15-850 |
| Length of Employment | Years on the Job * 17 |
| Age | Age * 13 |
| Annual OOP Max as % of Income | Percentage * 15-850 |

Process 1000 calculates each of the unit scores for the line items in the first column by taking the raw scores and following the math outlined in the second column.

The generated score can then be used as a management tool to assess the risks a creditor faces when lending to a debtor that owns an account from which he uses to save or invest money designated for health-related expenses, receives contributions from others including his employer, pays for insurance premiums, or pays healthcare providers or merchants of health-related products and services.

Process 1000 is generally designed to be applied to individuals that are in high deductible health plans (e.g., those plans that carry an annual insurance plan deductible of greater than $250) that place greater financial risk on the individual as the deductible may be higher than the individual's ability to pay for expenses up to it. In addition, some of these accounts are tax-advantaged and the consumer may wish to maximize savings in the account while tapping into a line of credit.

Process 1000 uses health insurance plan design information and/or general health and wellness data to generate the three-digit credit risk indicator.

As shown in FIG. 6, process 1000 includes receiving (1002) an employee's credit score, an employment premium as a percentage of income score, a deductible as a percentage of income score, a length of employment in years, an employee's age in years, and an annual out of pocket maximum as a percentage of income score. These scores represent a subset of the employee's health insurance plan design information and general health and wellness data.

Process 1000 weights (1004) the employment premium as a percentage of income score, the deductible as a percentage of income score, the length of employment in years, the employee's age in years, and the annual out of pocket maximum as a percentage of income score.

Process 1000 adds (1006) a sum of the weighted scores to the credit score to generate an interim value and divides (1008) the interim value by 6 to generate a credit risk indicator.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A computer-implemented method comprising:
   determining, via a data processing apparatus operating according to a computer program product tangibly embodied in an information carrier, weighted employee information comprising:
   a weighted employment premium as a percentage of income score within a fixed numerical range;
   a weighted deductible as a percentage of income score within the fixed numerical range; or
   a weighted annual out of pocket maximum as a percentage of income score within the fixed numerical range; and
   generating, via the data processing apparatus, a credit risk indicator using a credit score and the weighted employee information.

2. The computer-implemented method of claim 1 wherein the credit score is within the fixed numerical range.

3. The computer-implemented method of claim 1 wherein generating the credit risk indicator comprises adding the weighted scores to the credit score and dividing a number of scores added together.

4. A computer program product, tangibly embodied in an information carrier, the computer program product being operable to cause data processing apparatus to:
   determine weighted employee information comprising:
   a weighted employment premium as a percentage of income score within a fixed numerical range;
   a weighted deductible as a percentage of income score within the fixed numerical range; or
   a weighted annual out of pocket maximum as a percentage of income score within the fixed numerical range; and
   generate a credit risk indicator using a credit score and the weighted employee information.

5. The computer program product of claim 4 wherein the credit score is within the fixed numerical range.

6. The computer program product of claim 4 wherein generating the credit risk indicator comprises adding the weighted scores to the credit score and dividing by a number of scores added together.

7. A computer-implemented method comprising:
   receiving, at a data processing apparatus operating according to a computer program product tangibly embodied in an information carrier, an employee's health insurance plan design information and general health and wellness data;
   weighting, via the data processing apparatus, selected ones of the employee's health insurance plan design information and general health and wellness data, wherein the selected ones comprise an employment premium as a percentage of income score, a deductible as a percentage of income score or an out of pocket maximum as a percentage of income score; and
   generating, via the data processing apparatus, a credit risk indicator from the weighted selected ones of the employee's health insurance plan design information and general health and wellness data.

8. The computer-implemented method of claim 7 wherein the employee's health insurance plan design information and general health and wellness data is selected from the group consisting of health insurance plan profile information, general health information of the employee, personally-identifiable information and demographic information, and consumer credit score information.

9. The computer-implemented method of claim 7 wherein the credit risk indicator represents risks a creditor faces when lending to the employee that owns an account from which he/she uses to save or invest money designated for health-related expenses, receives contributions from others including his employer, pays for insurance premiums, or pays healthcare providers or merchants of health-related products and services.

10. A computer program product, tangibly embodied in an information carrier, the computer program product being operable to cause data processing apparatus to:
    receive an employee's health insurance plan design information and general health and wellness data;
    weight selected ones of the employee's health insurance plan design information and general health and wellness data, wherein the selected ones comprise an employment premium as a percentage of income score, a deductible as a percentage of income score, or an out of pocket maximum as a percentage of income score; and generate a credit risk indicator from the weighted selected ones of the employee's health insurance plan design information and general health and wellness data.

11. The computer program product of claim 10 wherein the employee's health insurance plan design information and general health and wellness data is selected from the group consisting of health insurance plan profile information, general health information of the employee, personally-identifiable information and demographic information, and consumer credit score information.

12. The computer program product of claim 10 wherein the credit risk indicator represents risks a creditor faces when lending to the employee that owns an account from which he/she uses to save or invest money designated for health-related expenses, receives contributions from others including his employer, pays for insurance premiums, or pays healthcare providers or merchants of health-related products and services.

* * * * *